United States Patent [19]

Karabinis

[11] 4,354,276
[45] Oct. 12, 1982

[54] EQUALIZING SIGNAL COMBINER

[75] Inventor: Peter D. Karabinis, Atkinson, N.H.

[73] Assignee: Bell Telephone Laboratories, Incorporated, Murray Hill, N.J.

[21] Appl. No.: 190,353

[22] Filed: Sep. 24, 1980

[51] Int. Cl.³ ............................................. H04B 7/08
[52] U.S. Cl. .................................... 455/139; 455/276
[58] Field of Search .................. 375/100; 371/68; 455/137, 138, 139, 272, 273, 276; 343/100 SA, 854

[56] References Cited

U.S. PATENT DOCUMENTS

| | | | |
|---|---|---|---|
| 2,786,133 | 3/1957 | Dyke | 455/276 |
| 2,951,152 | 8/1960 | Sichak et al. | 455/139 |
| 4,160,952 | 7/1979 | Seastrand, Jr. | 455/276 |
| 4,261,056 | 4/1981 | Barnett et al. | 455/276 |

Primary Examiner—Benedict V. Safourek
Attorney, Agent, or Firm—S. Sherman

[57] ABSTRACT

In a space diversity receiver, the relative phase of the two received signals is varied in manner to minimize amplitude dispersion in the combined signal. A phase control signal is derived from the combined signal by phase modulating one of the received signals, and then detecting the fundamental amplitude component induced by said modulation within two selected portions of the combined signal spectrum. The fundamental component of the envelope modulation of the weaker of the two signal portions is used to control the relative phase of the two received signals so as to minimize the amplitude dispersion in the combined signal across the band. In the absence of inband phase dispersion needed in order for the compensating phase shift to effect the two signal portions differently, a relative delay is introduced in one of the two received signal paths.

5 Claims, 5 Drawing Figures

EQUALIZING SIGNAL COMBINER

TECHNICAL FIELD

This invention relates to space diversity receivers and, in particular, to circuit arrangements for reducing amplitude dispersion in the combined signal.

BACKGROUND OF THE INVENTION

It is well known that radio waves, propagating from a transmitter to a receiver, can follow a plurality of different paths, and that the relative phase of the different waves arriving at the receiving antenna can be such as to destructively interfere, causing what is commonly referred to as a fade. In order to protect against this condition, the so-called "space diversity" system has been developed using two, spaced antennas to feed a diversity receiver. The theory underlying the use of two spaced-apart antennas is that there is less likelihood that a fade will occur at both antennas at the same time. In the simplest system, means are provided to disconnect the receiver from one antenna as soon as the received signal level falls below a predetermined threshold and to connect the receiver to the second antenna. In this so-called "blind switching," it is assumed that the signal received by the second antenna is stronger than that received by the first antenna. In a more sophisticated system, the signals from the two antennas are combined instead of switching between the two. This eliminates amplitude and phase jumps associated with the switching operation, and has the added advantage of delivering a larger amplitude signal to the receiver.

In analogue radio systems, it is the practice to adjust the phases of the two received signals so as to maximize the total power in the combined signal. For example, in U.S. Pat. No. 2,786,133 the relative phase of the local oscillator signals coupled to a pair of frequency converters is adjusted such that the resulting IF signals produced combine to maximize the total signal.

Studies have shown, however, that the situation is more complex in a digital radio system. In particular, it has been found that the bit error rate (BER) in a digital system is more sensitive to the degree of inband amplitude dispersion and less sensitive to the magnitude of a flat fade. Accordingly, in the copending application by Barnett et al, Ser. No. 57,748, filed July 16, 1979, and now U.S. Pat. No. 4,261,056 and assigned to applicant's assignee, there is disclosed an equalizing combiner which trades output power in favor of reduced amplitude dispersion by measuring the power in selected portions of the output signal and varying the circuit parameters in a manner to maintain any preselected relation among the measured signal components. There are, however, situations wherein the phase difference between the two received signals is constant across the band of interest. In that case, amplitude dispersion cannot be corrected simply by varying the phase of one signal relative to the other.

SUMMARY OF THE INVENTION

In a diversity equalizing combiner in accordance with the present invention, the fundamental amplitude modulation component, induced by phase modulating one of the two received signals, is detected within two selected portions of the combined signal spectrum. Advantageously, the signal portions are symmetrically located with respect to band center. The fundamental component of the amplitude modulation of the weaker of the two signal portions is then used to control the relative phase of the received signals so as to minimize the amplitude dispersion across the band. In the absence of inband phase dispersion, however, a simple phase adjustment cannot be used to reduce the amplitude dispersion. Accordingly, separate delay means are provided for locally introducing a sufficient amount of inband phase dispersion so as to permit amplitude compensation by phase control.

DETAILED DESCRIPTION

Figure 1:
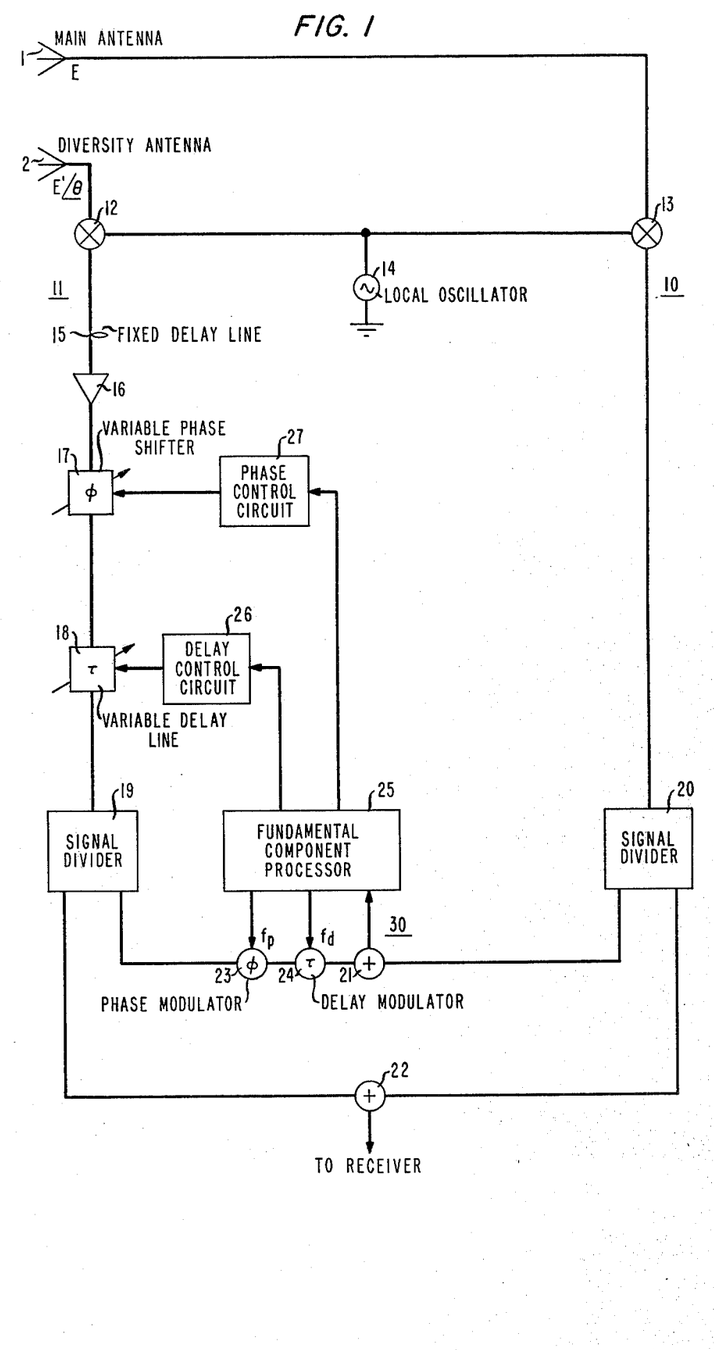
FIG. 1 shows, in block diagram, an illustrative embodiment of a diversity equalizing combiner in accordance with the present invention.

Referring to the drawings, FIG. 1 shows, in block diagram, a portion of a diversity receiver including an equalizing signal combiner in accordance with the present invention. The receiver portion shown includes a main signal antenna 1, a main signal path 10, a diversity signal antenna 2, a diversity signal path 11, and signal combining means 22. Also included is an auxiliary signal combining branch 30 and controls comprising a phase modulator 23, a delay modulator 24, an auxiliary signal combiner 21, a fundamental component processor 25 and associated phase and delay control circuits 27 and 26, respectively. In this particular illustrative embodiment, the main signal path 10 includes a frequency converter 13 and a signal divider 20. The diversity signal path 11 includes a frequency converter 12, a fixed delay line 15 and amplifier 16 for equalizing the two antenna circuits, variable phase shifter 17, variable delay line 18, and signal divider 19. One output from each of the dividers 19 and 20 is connected to a main signal combiner 22, whose combined output is coupled to the balance of the receiver (not shown). A second output from each of the dividers is connected to the auxiliary branch 30 including signal combiner 21, whose combined output is coupled to processor 25. Output signals from processor 25 are coupled to phase control circuit 27, which controls the phase of variable phase shifter 17, and to delay control circuit 26, which controls the delay introduced by variable delay line 18.

A local oscillator 14 is coupled to each of the frequency converters 12 and 13.

In operation, a first signal E, received by antenna 1, and a second signal $E' \angle \theta$, received by antenna 2, are summed in signal combiner 22 and coupled to the signal receiver. In those applications where maximum combined signal power is desired, the signal combining network is adapted to sense the relative phase angle, $\theta$, between the two received signals and to introduce a compensating relative phase shift between the two signals such that they combine in phase. (See, for example, U.S. Pat. No. 4,160,952). However, as noted hereinabove, in broadband digital systems, a more important consideration is inband amplitude dispersion. Accordingly, in an equalizing combiner, in accordance with the present invention, means are provided for sensing amplitude dispersion in the combined signal, and for adjusting the phase shift across the signal band in a manner to minimize the dispersion rather than to maximize the total signal power. This process is initiated in the embodiment of FIG. 1 by processor 25 which examines the signal derived from the auxiliary signal combiner 21. This signal includes a first signal component from the main signal wavepath 10 and a second signal component from the diversity signal wavepath 11 that has been subjected to combined phase and delay modulation. As will be explained in greater detail hereinbelow, the frequency, $f_p$, of the phsae modulation is at a much higher rate than the frequency, $f_d$, of the delay modulations. Typical values are $f_p=100$ Hz and $f_d=10$ Hz.

Figure 2:
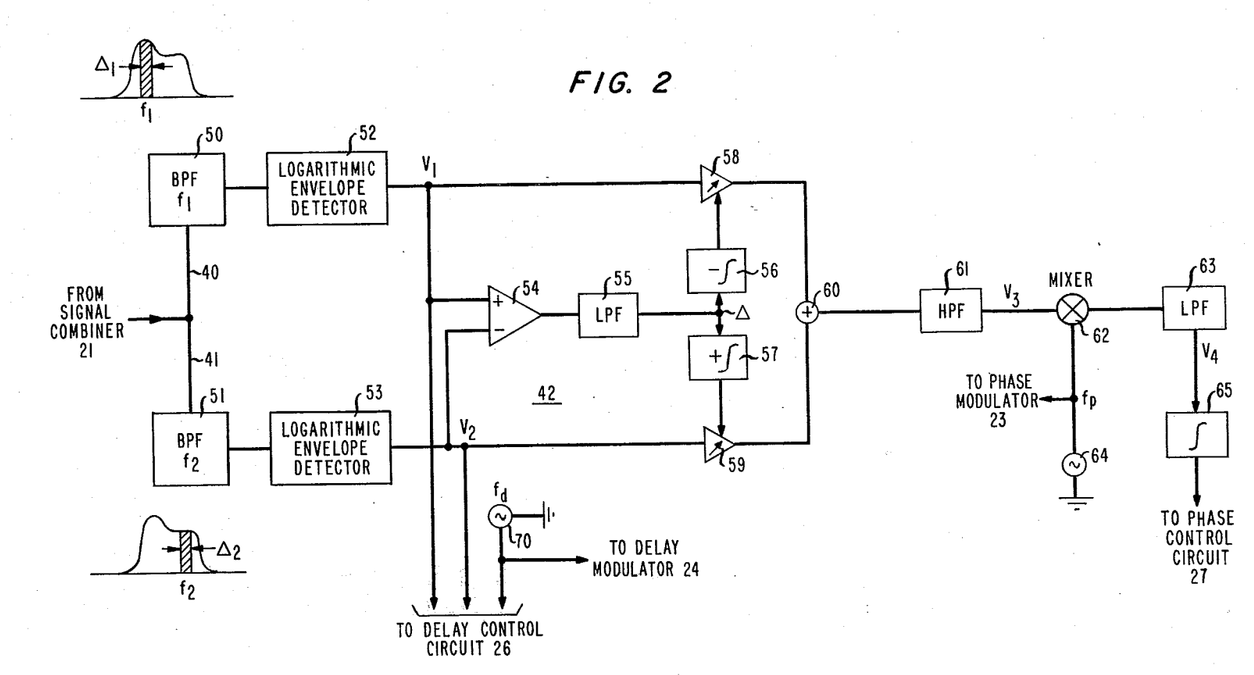
FIG. 2 shows the circuit details of a fundamental component processor.

FIG. 2, now to be considered, shows in block diagram, an illustrative embodiment of a processor for practicing the present invention. As indicated hereinabove, the processor receives a component of combined signal from signal combiner 21. This is applied by means of a first signal path 40 to a first bandpass filter (BPF) 50 which passes a portion $\Delta_1$ of the combined signal spectrum centered about a first frequency $f_1$. Simultaneously, the combined signal is applied by means of a second signal path 41 to a second bandpass filter (BPF) 51 which passes a portion $\Delta_2$ of the combined signal spectrum centered about a second frequency $f_2$. Typically, frequencies $f_1$ and $f_2$ are symmetrically located on opposite sides of the center of the signal band.

The signal portions thus isolated are coupled to logarithmic envelope detectors 52 and 53 whose outputs $V_1$ and $V_2$ are given by $$V_1 = V_a + V_{a1} \sin \omega_p t + V_{a2} \cos 2\omega_p t + \quad (1)$$

and $$V_2 = V_b + V_{b1} \sin \omega_p t + V_{b2} \cos 2\omega_p t + \quad (2)$$

where $\omega_p$ is the angular frequency of the phase modulation. ($\omega_p = 2\pi f_p$)

In equations (1) and (2), d.c. components $V_a$ and $V_b$ are a measure of the average power within the measured portions of the combined signal. The a.c. components are a measure of the amplitude modulation impressed upon the envelope of the combined signal due to the phase modulation of the diversity antenna signal. The fundamental component of this modulation (i.e., $V_{a1}$, $V_{b1}$) is a function of the average phase difference $\mu(t)$ between the two received signals, at signal combiner 21, and 22, and the voltage ratio $\delta(t)$ of the two signals. During frequency selective fading both $\mu(t)$ and $\delta(t)$ become frequency dependent functions, (i.e., $\mu(t) = \mu(\omega, t)$ and $\delta(t) = \delta(\omega, t)$) such that $V_{a1}$ and $V_{b1}$ are, in general, unequal. For narrow sampling intervals (i.e., $\Delta_1$ and $\Delta_2$ equal to a few Megahertz) the dispersion within the bands $\Delta_1$ and $\Delta_2$ can be neglected. Under this assumption, $\delta(\omega,t)$, $\mu(\omega,t)$ can be assumed to be frequency independent such that $V_{a1}$ and $V_{b1}$ are given by $$V_{a1} \approx \frac{CJ_1(\alpha)\sin\mu_a(t)}{\delta_a(t) + 1/\delta_a(t) + 2J_o(\alpha)\cos\mu_a(t)} \quad (3)$$

and $$V_{b1} \approx \frac{CJ_1(\alpha)\sin\mu_b(t)}{\delta_b(t) + 1/\delta_b(t) + 2J_o(\alpha)\cos\mu_b(t)} \quad (4)$$

where
$J_o$ and $J_1$ are Bessel functions of the first kind, and C is a constant greater than zero; and
$\alpha$ is the magnitude of the phase modulation.
In general, $\mu_a(t) \neq \mu_b(t)$.

The detected signals $V_1$ and $V_2$ are applied, respectively, to variable gain amplifiers 58 and 59, and to a gain control circuit 42 comprising differencing amplifier 54, low-pass filter (LPF) 55, and integrators 56 and 57. Circuit 42 takes the difference between $V_1$ and $V_2$ in differencing amplifier 54, then filters out the a.c. component in LPF 55 to produce the difference signal $\Delta$ between the d.c. components given by $$\Delta = V_a = V_b. \quad (5)$$

This difference signal is integrated over a period of time by integrating circuit 56, to produce a gain control signal for amplifier 58 which is a negative integral of the difference signal, and by integrating circuit 57, to produce a gain control signal for amplifier 59 which is a positive integral of the difference signal. Thus, for example, if $V_a > V_b$, $\Delta$ has a positive value and the output signals from integrators 56 and 57 are decreasing and increasing, respectively. The former, decreasing gain control signal biases amplifier 58 in its low gain region, while the latter, increasing gain control signal biases amplifier 59 in its high gain region. Conversely, when $V_b > V_a$, $\Delta$ is negative, and amplifier 58 is biased in its high gain region while amplifier 59 is biased in its low gain region. Thus, it will be noted that the signal with the larger DC component $V_1$ or $V_2$, has very little influence upon the operation of the phase control circuit as will be explained in greater detail hereinbelow. More generally, both signals $V_1$ and $V_2$ are weighted by the variable gain amplifiers 58 and 59 and then summed in a signal combiner 60 to produce a combined signal which, after filtering in a high pass filter 61, is given by $$V_3 = (g_a V_{a1} + g_b V_{b1}) \sin \omega_p t + (g_a V_{a2} + g_b V_{b2}) \cos 2\omega_p t + \quad (6)$$

where $g_a$ and $g_b$ are the gain factors of amplifiers 58 and 59, respectively.

To recover the magnitude of the fundamental component $(g_a V_{a1} + g_b V_{b1})$, signal $V_3$ is mixed in a mixer 62 with a component of the phase modulating signal derived from a local oscillator 64, and the resulting signal passed through a low-pass filter 63 to produce signal $V_4$ given by $$V_4 = K(g_a V_{a1} + g_b V_{b1}) \quad (7)$$

where K is a positive constant.

The latter signal is then integrated in an integrating circuit 65 to produce the phase control signal which is coupled to the phase control circuit 27.

Figure 4:
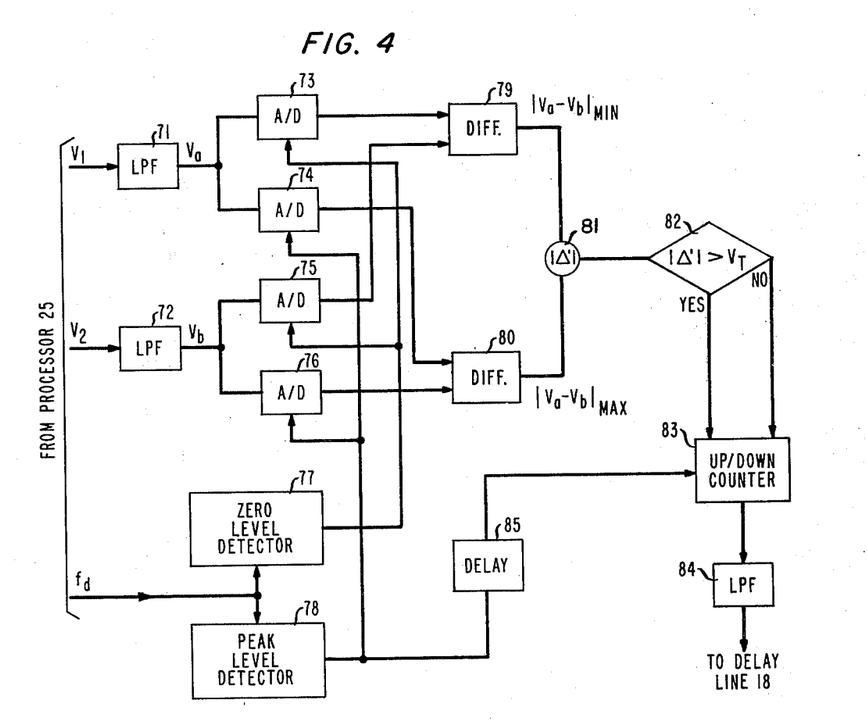
FIG. 4 shows the circuit details of a delay control circuit.

To illustrate the operation of the processor, let us consider the case where $V_1 >> V_2$. This results in amplifier 58 being cut off. Accordingly, the input to integrator 65 includes only the fundamental component from signal $V_2$, i.e., $Kg_b V_{b1}$. Conversely, if $V_2 >> V_1$, amplifier 59 is cut off and the input to integrator 65 includes only the fundamental component from signal ence signals will be large. To make this determination, the difference signals are coupled to an additional differencing circuit 81 to form signal $|\Delta'|$ which, in turn, is coupled to a threshold detector 82. If $|\Delta'|$ does not exceed a specified threshold level $V_T$, a "no" signal is coupled to an up/down counter 83, whose count decreases by one in response thereto. The up/down counter 83 is activated by a pulse from delay 85. Delay 85 produces a pulse after $|V_a-V_b|_{min}$ and $|V_a-V_b|_{max}$ have been accessed during each cycle of delay modulation. The count is converted to a d.c. control signal in a lowpass filter 84, whose output is communicated to variable delay line 18. As the delay introduced by line 18 decreases in response to the "no" signal, any resulting amplitude dispersion that may result by virtue of the decreasing delay introduced by delay line 18 is compensated for by slight readjustments in the phase shift introduced by phase shifter 17. As indicated hereinabove, because $f_p >> f_d$, the phase shift network responds very quickly to any changes in the amplitude equalization produced by changes in the delay line.

This process proceeds for so long as there is sufficient phase dispersion in one antenna signal for the phase shifter to amplitude equalize the combined signal. In the limit, the delay line adjusts to its minimum value.

If, on the other hand $|\Delta'|$ exceeds $V_T$, a "yes" signal is communicated to the up/down counter by the threshold detector. This implies that there is insufficient phase dispersion in both antenna signals for an adequate equalization of the combined signal. This results in an increasing count, and a corresponding increase in the delay introduced by line 18. This process continues until $|\Delta'|$ is decreased to a point corresponding to or below $V_T$, about which point the system stabilizes.

Figure 3:
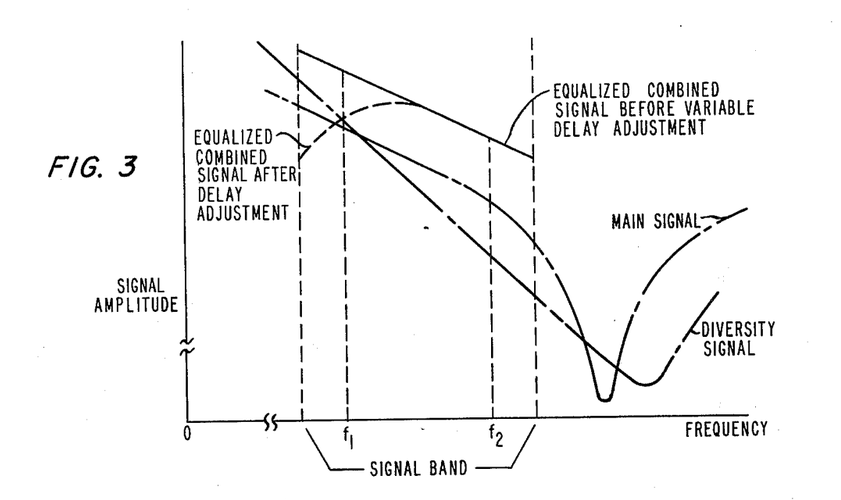
FIG. 3 shows the signal states for producing inband amplitude distortion with no inband phase distortion.

FIG. 3 shows the inband combined signal amplitude dispersion before and after the variable delay adjustment produced by two received signals of the type shown. For this fade condition, the equalizing combiner converts a linear amplitude distortion to a parabolic distortion. The latter is less objectionable in that it does not produce cross-rail intersymbol interference in broadband digital signals. Also note that in converting linear amplitude distortion to a parabolic distortion, the peak-to-peak inband amplitude distortion is reduced by a factor of ½.

Figure 5:
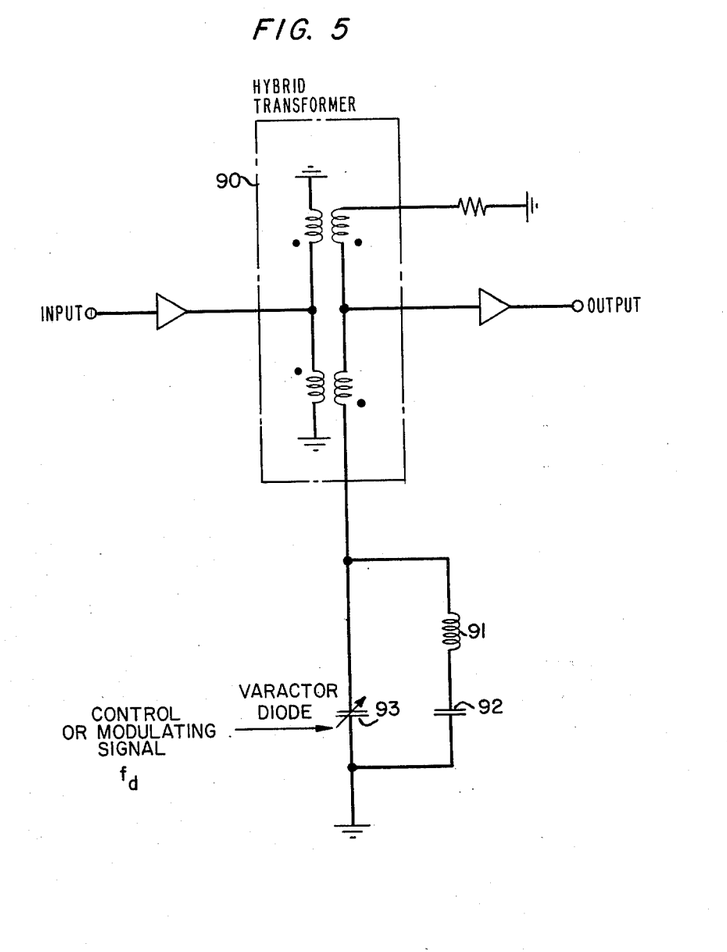
FIG. 5 shows an illustrative embodiment of a delay circuit.

FIG. 5 shows an allpass, variable delay circuit of a type that can be used as the variable delay line 18 and the delay modulator 24. The circuit comprises a hybrid transformer 90, and a tunable circuit comprising a first branch including an inductor 91 and a capacitor 92, and a second, parallel branch including a variable capacitor 93 (i.e., a varactor diode) which is biased by the delay control signal from circuit 26, or by the local oscillator 70. With a circuit of this type, a delay of 25 nanoseconds can be produced which is the equivalent of more than 180 degrees of phase dispersion over a 30 MHz band.

In the illustrative embodiment of FIG. 1 the variable phase shifter 17 and the variable delay line 18 are shown included in the diversity signal path 11. It will be recognized that both these adjustable compensating circuits can just as readily be placed in the main signal path 10 or, alternately, one can be included in path 10 and the other included in path 11. Also, in the illustrative embodiment of FIG. 1, compensation is made in the intermediate frequency portion of the diversity receiver. Alternatively, the compensating circuits can be located in the radio frequency portion of the receiver (i.e., before converters 12 and 13).

Finally, in the embodiment of FIG. 1 an auxiliary signal combining branch 30 is provided for generating the phase and delay control signals. While this arrangement is advantageous in that the phase and delay modulation impressed upon the input signal does not appear in the combined signal coupled to the receiver, branch 30 can be omitted and the modulators included in one or both of the wavepaths connected to signal combiner 22. For this arrangement, the input signal to processor 25 is derived from the output branch of combiner 22.

In the operation of the equalizing combiner described hereinabove, signals at opposite ends of the band of interest are monitored. These can either be components of the information signal or separately transmitted pilot tones included for this purpose.

I claim:
1. An equalizing signal combiner comprising:
   first and second signal paths (10, 11);
   signal combining means (21, 22) coupled (19, 20) to said two wavepaths (10, 11) for combining the signals therein;
   means (23) for phase modulating the signal in one of said signal paths to produce a fundamental component of amplitude variation in the combined signal;
   signal processing means (25) for sensing said fundamental signal components in two selected portions ($\Delta_1$, $\Delta_2$) of the frequency spectrum of said combined signal;
   and means (17) for varying the relative phase of the signals in said two wavepaths in response to the fundamental component of the weaker of said two signal components so as to minimize the amplitude dispersion of the combined signal within said frequency spectrum.

2. The equalizing signal combiner according to claim 1 wherein said selected portions are symmetrically located on opposite sides of the center of said frequency spectrum.

3. The equalizing signal combiner according to claim 1 wherein said signal processing means comprises:
   a first signal path (40) including a first bandpass filter (50) for isolating a first portion ($\Delta_1$) of said frequency spectrum, a first logarithmic envelope detector (52), and a first variable gain amplifier (58);
   a second signal path (41) including a second bandpass filter (51) for isolating a second portion ($\Delta_2$) of said frequency spectrum, a second logarithmic envelope detector (53), and a second variable gain amplifier (59);
   means (54) coupled to the output of said detectors (52, 53) for forming a difference signal ($\Delta$) proportional to the difference in the average values ($V_a$, $V_b$) of the two isolated signals;
   first means (56) for forming a negative integral of said difference signal ($\Delta$) and then varying the gain of said first amplifier (58) in response to said negative integral;
   second means (57) for forming a positive integral of said difference signal ($\Delta$) and then varying the gain of said second amplifier (59) in response to said positive integral;
   means (60, 61, 62, 63, 64) for summing the output of said amplifiers (58, 59) and extracting from said sum said fundamental signal components;
   means for integrating (65) said fundamental signal components;
   and means for coupling the output of said integrating means (65) to the phase control circuit (27).

$V_1$, i.e., $Kg_aV_{a1}$. In either case, a phase control signal is transmitted to the phase control circuit 27 which activates the variable phase shifter 17. The latter adjusts in a manner to reduce the difference signal $\Delta$ given by equation (5). Thus, the combiner responds to the weaker side of the signal band and adjusts the relative phase of the two received signals so as to favor the signal components on the weaker side at the expense of the components on the strong side. The net effect is to reduce the amplitude dispersion across the band.

Integrators 56 and 57 are advantageously designed to have large integration constants. So designed, a small input signal will produce a large output signal and quickly switch variable gain amplifiers 58 and 59 between their high gain and cut-off states. In this manner $V_4$ will instantaneously reflect the conditions of the weaker side of the signal spectrum. It will be further noted that the sign of $V_4$ is determined by $\sin \mu(t)$ i.e., by $\sin \mu_a(t)$ or by $\sin \mu_b(t)$. Thus, the sense of phase rotation, which depends upon the initial phase difference $\mu(t)$, is given. If, for example, the initial phase difference between the two signal components is less than 180 degrees and greater than zero, $V_4$ is positive, causing the phase to shift in one sense. If, on the other hand, it is greater than 180 degrees and less than 360, $V_4$ is negative and the sense of phase rotation is in the opposite direction.

Various types of variable phase shifters can be employed to practice the present invention. One illustrative example of a phase shifter including a phase stepper and a continuously variable phase shifter of limited range is described in U.S. Pat. No. 4,160,952. An alternate embodiment of a completely continuously variable phase shifter is disclosed in the copending application by G. L. Heiter, Ser. No. 948,889, filed Oct. 5, 1978.

It is one advantage of the present invention that in the absence of both inband amplitude and phase dispersion (i.e., nominal propagation conditions, or flat fading), the processor automatically maximizes the total power in the combined signal by making $\mu=0$ for all inband frequencies. This is because in the absence of all inband dispersion, $\mu_a(t)=\mu_b(\omega,t)$ for all $\omega$ in the channel. Therefore, regardless of the input signal, $V_{a1}$ or $V_{b1}$ to integrator 65, the variable phase shifter 17 will act as to minimize the phase $\mu_a(t)$ or $\mu_b(t)$, associated with the integrator input signal. This however will minimize the phase difference for all frequency components in the channel, since by assumption $\mu(t)$ is a constant across the entire band. Thus, all the frequency components are brought into phase and the total power in the combined signal is maximized.

There is a second signal condition, now to be considered, which cannot be equalized in the manner described thus far, i.e., by a simple variation in the relative phase of the two received signals. This condition arises whenever both received signals simultaneously experience an out-of-band fade notch on the same side of the signal band. As illustrated in FIG. 3, both the main signal and the diversity signal have a fade notch above the high end of the band, resulting in a high level of inband amplitude dispersion for the combined signal. However, because phase distortion produced by fading is confined primarily to a small frequency band about the fade notch, there may be no significant phase dispersion for either signal within the band, i.e., $\mu(t)$ is independent of frequency over the entire signal band. As a consequence, varying the relative phase shift between the two signals will make $\mu_a(t)=\mu_b(t)=\mu(\omega,t)=0$ for all $\omega$. This will serve to maximize the combined power which, in general, will not minimize the inband amplitude slope of the combined signal. To cope with this situation, phase dispersion is deliberately introduced into the system by means of the variable delay line 18. Because the phase characteristic of a delay line is a function of frequency, $\mu(f_1,t)$ will no longer be equal to $\mu(f_2,t)$, and it will be possible to introduce a phase shift which will favor the constructive combination of signal components at the high end of the band at the expense of those at the low end.

To determine whether or not a delay adjustment is required, the diversity signal in the auxiliary circuit is delay modulated by means of delay modulator 24, and the resulting effect upon the combined signal is examined. This examination is conducted in the delay control circuit 26, an illustrative embodiment of which is shown in FIG. 4. As indicated in FIGS. 2 and 4, components of signals $V_1$ and $V_2$, along with a component of signal from an oscillator 70, are coupled from the processor 25 to the delay control circuit. A second signal component is coupled from oscillator 70 to the delay modulator 24.

In practice, the frequency, $f_p$, of the phase modulation is made at least an order of magnitude greater than the frequency, $f_d$, of the delay modulation (i.e., $f_p>>f_d$). This means that in the course of operation, the combiner will first seek to equalize amplitude dispersion by means of a phase adjustment and will succeed in doing so whenever there is sufficient inband phase dispersion. In those cases, the change in the power content of the two sampled signals $V_1$ and $V_2$ induced by delay modulator 24 will be below some specified threshold, indicating that no change in variable delay line 18 is required. If, however, there is insufficient phase dispersion across the signal band, the delay modulation will result in a significant change in the relative power contents of signals $V_1$ and $V_2$. This indication will, in turn, result in an appropriate increase in the delay provided by the variable delay line 18. Thus, referring to FIG. 4, signal components $V_1$ and $V_2$ are applied to low-pass filters 71 and 72, respectively, to extract the d.c. signal components $V_a$ and $V_b$. Signal $V_a$ is applied to A/D converter 73 and 74 while signal component $V_b$ is applied to A/D converters 75 and 76.

Timing signals for sampling voltages $V_a$ and $V_b$ are generated in detectors 77 and 78 which receive a synchronizing signal in the form of a raised cosine. Detector 77 generates a first train of pulses which are synchronized with the zeros of the delay modulating signal. This pulse train is coupled to A/D converters 73 and 75 which sample signals $V_a$ and $V_b$ at the instants of minimum delay. The sampled signals are coupled to differencing circuit 79 to form a first difference signal $|V_a-V_b|_{min}$.

Similarly, detector 78 generates a second train of pulses which are synchronized with the positive peaks of the delay modulating signal. This pulse train is coupled to A/D converters 74 and 76 which sample signals $V_a$ and $V_b$, respectively, at the instants of maximum delay. The sampled signals are coupled to differencing circuit 80 to form a second difference signal $|V_a-V_b|_{max}$.

As indicated hereinabove, if the initial phase adjustment succeeded in equalizing $V_1$ and $V_2$, the perturbation produced by the delay modulation will be minimal, and the difference between $|V_a-V_b|_{max}$ and $|V_a-V_b|_{min}$ will be small. If, on the other hand, the equalization was inadequate, the difference between the differ- 4. The combiner according to claim 1 including means (18) for introducing a variable delay in one of said signal paths.

5. The combiner according to claim 4 including a delay modulator (24) for introducing a varying delay in one of the signals of the combined signal;
 a first signal path (40) including a first filter means (50) for isolating a first portion ($\Delta_1$) of said frequency spectrum, and a first logarithmic envelope detector (52);
 a second signal path (41) including second filter means (51) for isolating a second portion ($\Delta_2$) of said frequency spectrum, and a second logarithmic envelope detector (53);
 means (71, 73, 75, 77) and (72, 74, 76, 78) for forming a difference signal proportional to the difference in the average values ($V_a$, $V_b$) of the two isolated signal portions including a first difference signal $|V_a - V_b|_{min}$ at the instant of minimum delay introduced by said delay modulator and a second difference signal $|V_a - V_b|_{max}$ at the instant of maximum delay introduced by said delay modulator;
 means (81, 82) for sensing the difference in the magnitudes of said difference signals;
 and means (83, 84, 85) responsive to the output of said sensing means for adjusting the magnitude of the delay introduced by said variable delay means (18).

* * * * *

UNITED STATES PATENT AND TRADEMARK OFFICE
CERTIFICATE OF CORRECTION

PATENT NO. : 4,354,276
DATED : October 12, 1982
INVENTOR(S) : P. D. Karabinis

It is certified that error appears in the above—identified patent and that said Letters Patent is hereby corrected as shown below:

Column 3, line 13, "phsae" should read --phase--; in equation (1), line 35, after the plus, third occurrence, ellipses should be added --. . . --; line 39, in equation (2) after the plus, second occurrence, ellipses should be added --. . . --.
Column 4, line 19, in equation (5) before "$V_b$" change the equal to minus, line 45, in equation (6) after the plus, fourth occurrence, ellipses should be added--. . . --.
Column 5, line 42, after "$\mu_b$" add --(t)=$\mu$--.

Signed and Sealed this

Twenty-fifth Day of January 1983

[SEAL]

Attest:

GERALD J. MOSSINGHOFF

Attesting Officer

Commissioner of Patents and Trademarks